US010100162B2

(12) United States Patent
Mitadera

(10) Patent No.: US 10,100,162 B2
(45) Date of Patent: Oct. 16, 2018

(54) POLYAMIDE RESIN FILMS AND PROCESSES FOR MANUFACTURING THEM

(75) Inventor: Jun Mitadera, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1123 days.

(21) Appl. No.: 13/885,444

(22) PCT Filed: Nov. 17, 2011

(86) PCT No.: PCT/JP2011/076502
§ 371 (c)(1),
(2), (4) Date: May 15, 2013

(87) PCT Pub. No.: WO2012/077473
PCT Pub. Date: Jun. 14, 2012

(65) Prior Publication Data
US 2013/0230693 A1   Sep. 5, 2013

(30) Foreign Application Priority Data

Dec. 7, 2010 (JP) ................................ 2010-272142

(51) Int. Cl.
| | | |
|---|---|---|
| C08J 5/18 | (2006.01) | |
| B29C 59/04 | (2006.01) | |
| C08K 5/29 | (2006.01) | |
| C08K 7/04 | (2006.01) | |
| C08K 7/14 | (2006.01) | |
| B29K 77/00 | (2006.01) | |
| B29C 59/02 | (2006.01) | |

(52) U.S. Cl.
CPC .............. C08J 5/18 (2013.01); B29C 59/04 (2013.01); C08K 5/29 (2013.01); B29C 2059/023 (2013.01); B29K 2077/00 (2013.01); C08J 2377/06 (2013.01); C08K 7/04 (2013.01); C08K 7/14 (2013.01); Y10T 428/24355 (2015.01)

(58) Field of Classification Search
CPC .............. C08J 5/18; C08L 77/06; C08L 79/00
See application file for complete search history.

(56) References Cited

U.S. PATENT DOCUMENTS

| 2007/0104971 A1 | 5/2007 | Wursche et al. |
| 2008/0081202 A1 | 4/2008 | Nanba et al. |
| 2009/0269533 A1 | 10/2009 | Sato |
| 2010/0004406 A1 | 1/2010 | Sato |
| 2013/0066041 A1 | 3/2013 | Mitadera et al. |
| 2013/0078402 A1 | 3/2013 | Mitadera et al. |
| 2013/0123439 A1 | 5/2013 | Mitadera et al. |
| 2013/0172460 A1 | 7/2013 | Mitadera et al. |

FOREIGN PATENT DOCUMENTS

| CA | 2565483 A1 | 4/2007 | |
| CN | 1955225 A | 5/2007 | |
| CN | 101152764 A | 4/2008 | |
| CN | 101528854 A | 9/2009 | |
| EP | 2 078 735 A1 | 7/2009 | |
| JP | 4-85249 A | 3/1992 | |
| JP | 05318992 A | * 12/1993 | ............ B44C 1/227 |
| JP | 9-95546 A | 4/1997 | |
| JP | 2002-307518 A | 10/2002 | |
| JP | 2007-119782 A | 5/2007 | |
| JP | 2008-80690 A | 4/2008 | |
| JP | 2008-94049 A | 4/2008 | |
| JP | 2008-133455 A | 6/2008 | |
| JP | 2009-141293 A | 6/2009 | |
| JP | 2009-279927 A | 12/2009 | |
| JP | 2010-707 A | 1/2010 | |
| JP | 2010-248418 A | 11/2010 | |

OTHER PUBLICATIONS

Translation of JP 2007-119782.*
Derwent Abstract of JP 05-318992.*
Translation of JP 05-318992.*
Combined Chinese Office Action and Search Report dated Nov. 5, 2014 in Patent Application No. 201180059082.1 (with English translation of categories of cited documents).
U.S. Appl. No. 14/528,063, filed Oct. 30, 2014, Mitadera.
Office Action dated Mar. 31, 2015 in Japanese Patent Application No. 2012-547760.
International Search Report and Written Opinion of the International Searching Authority dated Dec. 20, 2011, in PCT/JP2011/076502 (with English translations).
International Preliminary Reports on Patentability dated Jun. 20, 2013 in PCT/JP2011/076502.
U.S. Appl. No. 13/822,152, filed Mar. 11, 2013, US2013/0172460 A1, Mitadera, et al.
U.S. Appl. No. 13/809,499, filed Jan. 10, 2013, US2013/0123439 A1, Mitadera, et al.
U.S. Appl. No. 13/702,865, filed Dec. 7, 2012, US2013/0078402 A1, Mitadera, et al.
U.S. Appl. No. 13/698,292, filed Nov. 16, 2012, US2013/0066041 A1, Mitadera, et al.
Office Action dated Mar. 7, 2018 in Canadian Application No. 2,820,634 filed Nov. 17, 2011, 3 pages.
Extended European Search Report dated Nov. 7, 2016 in Patent Application No. 11846628.3.

* cited by examiner

*Primary Examiner* — Victor S Chang
(74) *Attorney, Agent, or Firm* — Oblon, McClelland, Maier & Neustadt, L.L.P.

(57) ABSTRACT

Provided is a windable thin single layer film comprising a xylylenediamine-based polyamide resin.
A polyamide resin film comprising a polyamide resin (C) obtained by polycondensing a diamine structural unit of which 70 mol % or more is derived from xylylenediamine (A) with a dicarboxylic acid (B), wherein the film has a thickness of 10 to 50 μm and is textured on the surface.

20 Claims, No Drawings

POLYAMIDE RESIN FILMS AND PROCESSES FOR MANUFACTURING THEM

TECHNICAL FIELD

The present invention relates to polyamide resin films and processes for manufacturing them, specifically thin polyamide resin films having improved productivity and processes for manufacturing them.

BACKGROUND ART

Polyamide resins are generally widely used as engineering plastics having excellent mechanical properties, chemical resistance, oil resistance, gas barrier properties and the like. Xylylenediamine-based polyamide resins obtained by polymerizing xylylenediamine such as m-xylylenediamine and an aliphatic dicarboxylic acid such as adipic acid (hereinafter sometimes referred to as "polyamides XD") are widely used because they have higher strength, higher elastic modulus, lower water absorption and better gas barrier properties as compared with polyamide 6 and polyamide 66 and the like and they can be further coextruded or coinjection-molded with thermoplastic resins such as polyethylene terephthalate, polyamide 6, polyethylene and polypropylene. For example, oriented multilayer films prepared by orienting a coextruded laminate of polyamide 6 and polyamide MXD6 made from m-xylylenediamine and adipic acid or multilayer sheets comprising a coextruded laminate of polypropylene and polyamide MXD6 have been commercialized as food packaging materials.

However, any unstretched thin single layer film could not be constantly and continuously prepared from polyamides XD because of their low elongation, high flexural modulus and brittleness so that if one tried to prepare a single layer film having a thickness of 50 μm or less, especially 30 μm or less, the resulting film would be easily broken by stress or tension applied to the film during molding even though polyamides XD could be readily molded into single layer films having a thickness of 100 μm or more. Even if they could be constantly prepared into thick films, wrinkles occurred in the films to severely impair their commercial value due to the frictional resistance between the film surfaces when they were taken up in rolls.

Further, it would be desirable to laminate a thin single layer polyamide XD film having a thickness of 30 μm or less with a polypropylene film or the like to form a highly retort-resistant packaging material or to laminate a thin film with a carbon fiber or glass fiber or plant fiber and hot-press the laminate to form a molded article. However, any single layer polyamide XD film that can be applied to even such requirements has not been provided because any roll of a thin single layer film could not be constantly supplied due to the problems described above.

On the other hand, a method for reducing adhesion between films or friction between a film and another member or the like has been known by adding inorganic particles to form protrusions on the surface of the film for the purpose of improving stability during molding of the film (see patent document 1). However, if one tried to apply this method to polyamides XD, the incorporation of inorganic particles would further reduce the elongation of the polyamides XDs and rather increase breakage during the preparation of a film, thus failing to solve the problem that a single layer polyamide XD film cannot be constantly produced in the form of a roll, especially that it is very difficult to produce a thin single layer film of 30 μm or less. Moreover, polyamides XD have the problem of difficulty in uniformly dispersing inorganic particles therein. Additionally, another problem resides in that this method cannot be applied to purposes in which inorganic particles cannot be incorporated.

REFERENCES

Patent Documents

Patent document 1: JP-A H9-095546

DISCLOSURE OF THE INVENTION

Problems to be Solved by the Invention

The present invention aims to solve the problems described above and to provide thin single layer xylylenediamine-based polyamide resin films, and also to provide highly commercially valuable single layer xylylenediamine-based polyamide resin film rolls by preventing breakage of films during the production thereof to increase productivity and to facilitate the films to be taken up in rolls during the production thereof. Further, it aims to prevent breakage of the films to improve their processability during post-processing of the films.

Means for Solving the Problems

As a result of careful studies to achieve the above objects, we accomplished the present invention on the basis of the finding that the problems described above can be solved by a surface-textured film obtained by texturing a film of a xylylenediamine-based polyamide resin immediately after the polyamide resin (C) is extruded from a die.

Thus, in the first invention of the present invention, provided is a polyamide resin film comprising a polyamide resin (C) obtained by polycondensing a diamine structural unit of which 70 mol % or more is derived from xylylenediamine (A) with a dicarboxylic acid (B), wherein the film has a thickness of 10 to 50 μm and is textured on a surface.

In the second invention of the present invention, provided is the polyamide resin film according to the first invention, wherein the polyamide resin (C) is textured by a first roll that the polyamide resin (C) contacts with after the polyamide resin (C) is extruded from an extrusion die and a roll opposed to the first roll.

In the third invention of the present invention, provided is the polyamide resin film according to the first invention, which has a surface roughness (Ra) of 0.01 to 1 μm.

In the fourth invention of the present invention, provided is the polyamide resin film according to the first invention, wherein the xylylenediamine (A) is m-xylylenediamine, p-xylylenediamine or a mixture of m-xylylenediamine and p-xylylenediamine.

In the fifth invention of the present invention, provided is the polyamide resin film according to the first invention, wherein the dicarboxylic acid (B) is a dicarboxylic acid comprising 50 mol % or more of a straight chain aliphatic α,ω-dicarboxylic acid containing 4 to 20 carbon atoms.

In the sixth invention of the present invention, provided is the polyamide resin film according to the first invention, wherein the dicarboxylic acid (B) is a dicarboxylic acid comprising 70 mol % or more of a straight chain aliphatic α,ω-dicarboxylic acid containing 4 to 20 carbon atoms and 1 mol % or more to less than 30 mol % of isophthalic acid.

In the seventh invention of the present invention, provided is the polyamide resin film according to the first invention, wherein the dicarboxylic acid (B) is adipic acid or sebacic acid.

In the eighth invention of the present invention, provided is the polyamide resin film according to the present invention, wherein the polyamide resin (C) is a poly(m-xylylene sebacamide) resin, a poly(p-xylylene sebacamide) resin or a poly(m-xylylene/p-xylylene sebacamide) copolymer resin.

In the ninth invention of the present invention, provided is the polyamide resin film according to the present invention, wherein the polyamide resin (C) comprises 0.1 to 2 parts by mass of a carbodiimide compound per 100 parts by mass of the polyamide resin (C).

In the tenth invention of the present invention, provided is the polyamide resin film according to the present invention, which is an unstretched film.

In the eleventh invention of the present invention, provided is a process for manufacturing the polyamide resin film according to the polyamide resin film in the first invention, comprising texturing the polyamide resin (C) by a first roll that the polyamide resin (C) contacts with after the polyamide resin (C) is extruded from an extrusion die and a roll opposed to the first roll.

In the twelfth invention of the present invention, provided is the process for manufacturing the polyamide resin film according to the eleventh invention of the present invention, wherein the texturing rolls have a surface roughness (Ra) of 0.01 to 3 μm.

In the thirteenth invention of the present invention, provided is the process for manufacturing the polyamide resin film according to the eleventh invention of the present invention, wherein the temperature of the texturing rolls during the texturing ranges from [Tg−10° C.] to [Tg+30° C.] wherein Tg is the glass transition temperature of the polyamide resin (C).

In the fourteenth invention of the present invention, provided is the process for manufacturing the polyamide resin film according to the eleventh invention of the present invention, wherein the distance from the extrusion die to the texturing rolls is 0.1 to 300 cm.

Advantages of the Invention

The polyamide resin films of the present invention readily provide windable thin single layer films that were previously difficult to achieve from xylylenediamine-based polyamide resins which is hard, has low elongation and low melt tension and readily break once the xylylenediamine-based polyamide resins have solidified in the form of films, thereby facilitating the films to be taken up in rolls during the production thereof and thus providing highly commercially valuable film rolls.

Further, the films of the present invention have high processability during post-processing by preventing breakage so that they can be post-processed, e.g., they can be laminated with polypropylene or the like and used as retort-resistant thin laminate packaging materials or they can be laminated with carbon fibers or glass fibers or plant fibers or the like in multiple layers and hot-pressed and thus used as composite molded materials.

THE BEST MODE FOR CARRYING OUT THE INVENTION

The polyamide resin films of the present invention are films comprising a polyamide resin (C) obtained by polycondensing a diamine structural unit containing 70 mol % or more of a moiety derived from xylylenediamine (A) with a dicarboxylic acid (B), characterized in that the films have a thickness of 10 to 50 μm and are textured on the surface.

The present invention first achieves a continuously and constantly windable film using such a polyamide resin (C) that could not be prepared into a thin film by conventional film forming techniques because it is especially hard and has low elongation and readily breaks once it has solidified in the form of a film. Further, a film roll that can be readily subjected to post-processing such as slitting can be obtained.

The polyamide resin (C) used in the present invention is a xylylenediamine-based polyamide resin obtained by polycondensing a diamine structural unit containing 70 mol % or more of a moiety derived from xylylenediamine (A) with a dicarboxylic acid (B). Preferably, it is a xylylenediamine-based polyamide resin containing 70 mol % or more, more preferably 80 mol % or more of a diamine structural unit (a structural unit derived from a diamine) derived from m-xylylenediamine and/or p-xylylenediamine and also preferably containing 50 mol % or more, more preferably 70 mol % or more, especially preferably 80 mol % or more of a dicarboxylic acid structural unit (a structural unit derived from a dicarboxylic acid) derived from a straight chain aliphatic α,ω-dicarboxylic acid preferably containing 4 to 20 carbon atoms.

The m-xylylenediamine and p-xylylenediamine are preferably a diamine mixture consisting of 55 to 100 mol % of m-xylylenediamine and 45 to 0 mol % of p-xylylenediamine, more preferably 60 to 100 mol % of m-xylylenediamine and 40 to 0 mol % of p-xylylenediamine.

Examples of diamines other than m-xylylenediamine and p-xylylenediamine that can be used as starting diamines of the xylylenediamine-based polyamide resin may include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decane and bis(aminomethyl)tricyclodecane; diamines having an aromatic ring such as bis(4-aminophenyl)ether, p-phenylenediamine and bis(aminomethyl)naphthalene and the like; and they can be used alone or as a mixture of two or more of them.

When a diamine other than xylylenediamine is used as a starting diamine, it should preferably be used at a proportion of less than 30 mol %, more preferably 1 to 25 mol %, especially preferably 5 to 20 mol % of the diamine structural unit.

Examples of preferred straight chain aliphatic α,ω-dicarboxylic acids containing 4 to 20 carbon atoms for use as starting dicarboxylic acids of the polyamide resin (C) may include, for example, aliphatic dicarboxylic acids such as succinic acid, glutaric acid, pimelic acid, suberic acid, azelaic acid, adipic acid, sebacic acid, undecanoic diacid, dodecanoic diacid and the like, and they can be used alone or as a mixture of two or more of them, among which adipic acid or sebacic acid, especially sebacic acid is preferred because the resulting polyamide resin has a melting point in a range appropriate for molding as well as good gas barrier properties.

Examples of dicarboxylic acids other than the straight chain aliphatic α,ω-dicarboxylic acids containing 4 to 20 carbon atoms mentioned above include phthalic acid compounds such as isophthalic acid, terephthalic acid and orthophthalic acid; isomeric naphthalenedicarboxylic acids such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid and the like; and they can be used alone or as a mixture of two or more of them.

A preferred dicarboxylic acid for use as a starting dicarboxylic acid other than the straight chain aliphatic α,ω-dicarboxylic acids containing 4 to 20 carbon atoms is isophthalic acid because of productivity and barrier properties. The proportion of isophthalic acid is preferably less than 30 mol %, more preferably 1 mol % or more to less than 30 mol %, especially preferably in the range of 5 to 20 mol % of the dicarboxylic acid structural unit.

The polyamide resin (C) is most preferably a poly (m-xylylene sebacamide) resin, a poly (p-xylylene sebacamide) resin, and a poly (m-xylylene/p-xylylene sebacamide) copolymer resin obtained by polycondensing a xylylenediamine mixture of m-xylylenediamine and p-xylylenediamine with sebacic acid. These polyamide resins are easily subjected to texturing and tend to show especially good continuous film-forming productivity.

The melting point of the polyamide resin (C) is preferably 150 to 300° C., more preferably 160 to 300° C. When it is in the above ranges, productivity during film formation tends to improve.

Moreover, the glass transition point of the polyamide resin (C) is preferably 50 to 100° C., more preferably 55 to 100° C., even more preferably 60 to 100° C. When it is in the above ranges, heat resistance tends to improve.

The melting point and glass transition point here can be determined by differential scanning calorimetry (DSC). They refer to the melting point and glass transition point determined by melting a sample by heating it once to eliminate the influence of thermal history on crystallinity and then heating it again. For example, they are determined by using DSC-60 available from SHIMADZU CORPORATION as follows: a sample of about 5 mg is melted by heating from room temperature to a temperature equal to or higher than an expected melting point at a rate of 10° C./min in an atmosphere of a nitrogen gas stream at 30 ml/min, and then rapidly cooled. Then, the sample is heated at a rate of 10° C./min to a temperature equal to or higher than the melting point, whereby the melting point and glass transition point can be determined.

The polyamide resin (C) is conveniently used when it has a terminal amino group concentration ([NH$_2$]) of preferably less than 100 µeq/g, more preferably 5 to 75 µeq/g, even more preferably 10 to 60 µeq/g, and a terminal carboxyl group concentration of preferably less than 150 µeq/g, more preferably 10 to 120 µeq/g, even more preferably 10 to 100 µeq/g. Those having a terminal amino group concentration and a terminal carboxyl group concentration in the above ranges tend to have good reactivity with the carbodiimide compounds described later, resulting in films having excellent physical properties.

The terminal amino group concentration can be determined by dissolving 0.5 g of a polyamide resin in 30 ml of a phenol/methanol (4:1) mixed solution with stirring at 20 to 30° C. and titrating the solution with 0.01 N hydrochloric acid. Similarly, the terminal carboxyl group concentration can be calculated as follows: 0.1 g of a polyamide resin is dissolved in 30 ml of benzyl alcohol at 200° C. and 0.1 ml of a phenol red solution is added in the range of 160° C. to 165° C. This solution is titrated with a titration solution of 0.132 g of KOH in 200 ml of benzyl alcohol (0.01 mol/l expressed as KOH content) until the endpoint is reached at which the color changes from yellow to red completely.

Further, the polyamide resin (C) of the present invention has a number average molecular weight of 10,000 to 60,000, preferably 11,000 to 50,000, more preferably 12,000 to 40,000. When it is in such ranges, the resin can be easily molded into a film and the resulting film tends to have good performance such as flex resistance.

The number average molecular weight here is calculated from the terminal amino group concentration [NH$_2$] (µeq/g) and the terminal carboxyl group concentration [COOH] (µeq/g) of a polyamide resin by the equation below:

$$\text{Number average molecular weight} = 2{,}000{,}000/([COOH]+[NH_2]).$$

The polyamide resin (C) preferably has a relative viscosity (determined under conditions of a concentration of 1 g/100 ml in 96% sulfuric acid at a temperature of 25° C.) of 1.6 to 3, more preferably 1.7 to 2.9, most preferably 1.8 to 2.8. If the relative viscosity is too low, the resulting film tends to have insufficient mechanical strength, but if it is too high, film-forming productivity tends to decrease.

The process for manufacturing the polyamide resin (C) is not specifically limited, but can be performed by using any techniques and polymerization conditions. For example, the polyamide resin can be prepared by heating a salt composed of xylylenediamine and a dicarboxylic acid under pressure in the presence of water to polymerize it in the molten state while removing the added water and condensed water.

It can also be prepared by directly adding a diamine to a dicarboxylic acid in the molten state to polycondense them at atmospheric pressure. In the latter case, polycondensation proceeds by continuously adding the diamine to the dicarboxylic acid while heating the reaction system to a reaction temperature not lower than the melting points of the oligoamide and polyamide produced to maintain the reaction system in a homogeneous liquid state.

During polycondensation of the polyamide resin, a small amount of a monoamine or monocarboxylic acid may be added as a molecular weight modifier.

The polyamide resin (C) can also contain polyamide resins other than xylylenediamine-based polyamide resins and elastomers. The other polyamide resins include polyamide 66, polyamide 6, polyamide 46, polyamide 6/66, polyamide 10, polyamide 612, polyamide 11, polyamide 12, polyamide 66/6T composed of hexamethylenediamine, adipic acid and terephthalic acid, and polyamide 6I/6T composed of hexamethylenediamine, isophthalic acid and terephthalic acid, etc.

Elastomers that can be used include, for example, known elastomers such as polyolefin elastomers, diene elastomers, polystyrene elastomers, polyamide elastomers, polyester elastomers, polyurethane elastomers, fluorinated elastomers, silicone elastomers and the like, preferably polyolefin elastomers and polystyrene elastomers.

These elastomers also preferably include those modified with α,β-unsaturated carboxylic acids and their anhydrides, acrylamides and derivatives thereof in the presence or absence of a radical initiator to impart compatibility with the polyamide resin (C).

The content of such other polyamide resins or elastomers is typically 30% by mass or less, preferably 20% by mass or less, especially 10% by mass or less.

The polyamide resin (C) is readily broken by a small stress or non-uniform stress applied during molding when it is to be molded into a thin film by conventional molding processes. However, it is thought that the polyamide resin films of the present invention can be prevented from breakage because they are textured on the surface, i.e., they have small crests and troughs on the surface, whereby the frictional resistance between the film surfaces and a take-up device, i.e., a roll or the like can be reduced and the stress applied on the films can be reduced and uniformly controlled during molding of the films. Further, the films can be taken up in rolls without wrinkles by reducing the friction between the film surfaces, thereby reducing the stress during take-up and preventing breakage of the films. Moreover, productivity can be improved by preventing friction with the machine to avoid breakage during post-processing such as slitting in any width on film rolls or dry lamination with other films.

The films may be textured on either one side or both sides, but preferably both sides.

As used herein, the term "texture" broadly refers to a small relief morphology on the surface of a film, and the term "texturing" refers to a process for forming a small relief morphology on the surface of a film. The texture pattern is not specifically limited, and includes any small relief surfaces such as leather-like texture, matte texture, wood-like texture, sand-like texture, wrinkle patterns and rock-like texture. Among others, matte texture is preferred. Round (spherical) or elliptical crests and troughs are especially preferred. The round (spherical) or elliptical crests and troughs may randomly exist, but preferably they are regularly arranged because the frictional force uniformly decreases to readily prevent breakage during molding.

The textured films preferably have a surface roughness (Ra) of 0.01 to 1 µm, more preferably 0.015 to 0.8 µm, even more preferably 0.1 to 0.6 µm, especially 0.2 to 0.5 µm. If it is less than 0.01 µm, the frictional force between the films and a film forming machine cannot be sufficiently reduced so that the films may be broken by the stress applied on the films during molding. Further, the frictional force between the films cannot be sufficiently reduced so that wrinkles may occur in the films when they are taken up in rolls to impair their commercial value. If it exceeds 1 µm, the appearance of the films may be impaired.

The relief texture on the film surfaces preferably has a peak-to-peak distance between adjacent crests of 0.1 to 1 µm, more preferably 0.2 to 0.9 µm, even more preferably 0.5 to 0.8 µm, especially 0.6 to 0.7 µm. When it is in such ranges, the frictional force between the films and a film forming machine can be sufficiently reduced and the stress applied on the films can be reduced so that the films can readily be prevented from breakage during molding. Further, the frictional force between the films sufficiently decreases so that the films can readily be prevented from wrinkles when they are taken up in rolls. Moreover, the films can readily be prevented from breakage during post-processing.

The surface roughness (Ra) of the film surfaces and the peak-to-peak distance between adjacent crests can be determined by scanning probe microscopy. Specifically, a profile curve of the surface of a film is obtained by scanning the surface of the film in an area of 40 µm square by atomic force microscopy using a scanning probe microscope (SP13800N SPA400) available from SII NanoTechnology Inc. in AFM mode. The arithmetic average roughness of the surface is determined from the obtained profile curve by applying the method defined in JIS R1683:2007 and reported as surface roughness Ra.

The peak-to-peak distance between adjacent crests can be determined as the average of the peak-to-peak distances between adjacent crests at random ten points measured from the profile curve of the film surface obtained in the same manner as for the analysis of Ra. Details of analytical conditions are as follows.
Analysis mode: AFM mode
Scanner: 150 µm$^2$
Target area: 40 µm×40 µm
Strain: −0.1
Scanning frequency: 1.00 Hz
Number of X data: 512
Number of Y data: 512
Cantilever: SN-AF01 100 µm triangular The polyamide resin films of the present invention have a thickness of 10 to 50 µm, preferably 15 to 40 µm, more preferably 20 to 30 µm. When it is in such ranges, productivity during post-processing improves and the resulting molded article has improved physical properties.

A preferred process for manufacturing the polyamide resin films of the present invention is described below.

First, the starting polyamide resin (C) is fed to an extruder hopper optionally with various additives, and plasticized and melted in the extruder. The melted polyamide resin is forced through a flat die or cylinder die attached to the end of the extruder and cooled and solidified by cooling rolls, during which textures are the film surface is preferably formed by pressurizing the film between two rolls consisting of the first roll that it encounters and a roll opposed thereto.

To confer a relief texture on the film, the surfaces of the rolls are textured. Both of the rolls may be textured or only one may be textured.

The film may also be formed by the extruder by inflation through an annular die, in which case the extruded film is also preferably textured between a pair of rolls.

The distance from the extrusion die to the texturing rolls is preferably in the range of 0.1 to 300 cm, more preferably in the range of 0.2 to 50 cm, even more preferably in the range of 0.5 to 10 cm. Such distances are preferred because the texture is favorably transferred to the film surface. As used herein, the distance from the extrusion die to the texturing rolls refers to the length of a film travelling from the exit of the die until it encounters the texturing rolls.

Known methods can be employed to form a relief texture on the surfaces of the texturing rolls, and include, for example, forming a relief by sand blasting or the like, discharge processing, selective chrome plating or the like, etc. The material of the rolls is not limited, and known materials such as stainless steel can be used.

A specific value of the surface roughness (Ra) of the textured surfaces of the rolls is preferably in the range of 0.01 to 3 µm, more preferably 0.1 to 2 µm, especially 0.2 to 1 µm.

The surface roughness of the textured rolls can be determined by known methods, e.g., surface profilometry using a stylus profilometer, optical interference profiler or digital microscope; surface profilometry by laser microscopy and the like; and the surface roughness (Ra) of the textured surfaces of the rolls can be defined according to JIS B0633 (2001) using a contact surface profilometer.

The temperature of the two rolls during texturing is preferably in the range of [Tg−10° C.] to [Tg+30° C.], more preferably [Tg−5° C.] to [Tg+20° C.], even more preferably [Tg] to [Tg+15° C.] wherein Tg is the glass transition point of the polyamide resin (C). When it is in such ranges, the film can be readily textured and can be taken up while preventing the resin from adhering to the texturing rolls, whereby productivity tends to improve.

The polyamide resin films of the present invention can be wound up around a core or the like in film rolls having a film length of 500 m or more, even 1,000 m or more, which is epoch-making in contrast to conventional films that could not be taken up.

The polyamide resin films of the present invention characterized in that they are textured on the surface may be prepared by texturing an oriented film, but preferably texturing an unstretched film in terms of productivity. However, the present invention does not exclude reheating and orienting an unstretched textured film.

Further, the films of the present invention can be laminated with other resins by dry lamination or the like during post-processing. The resins with which they can be laminated include non-xylylenediamine-based polyamide resins, ethylene-vinyl alcohol copolymer resins, polyvinylidene chloride resins, polyethylene resins, polypropylene resins, ethylene-vinyl acetate copolymer resins, polyester resins, etc.

The polyamide resin (C) used in the present invention can be combined with various additives as appropriate so far as the object of the present invention is not affected.

Specifically, it can be combined with, for example, hydrolysis resistance improvers such as carbodiimide compounds; flame retardants; organic stabilizers such as phosphorus stabilizers, hindered phenol stabilizers, hindered amine stabilizers, organic sulfur stabilizers, oxanilide stabilizers and secondary aromatic amine stabilizers; inorganic stabilizers such as copper compounds and halides; nucleating agents such as talc and boron nitride; conductive agents; lubricants; plasticizers; release agents; pigments; dyes; dispersing agents; antistatic agents; UV absorbers; shock resistance improvers; and other well-known additives.

Other resins than the polyamide resins of the present invention can also be contained so far as the benefits of the present invention are not affected.

Among these additives, carbodiimide compounds as hydrolysis resistance improvers are preferably contained. Carbodiimide compounds preferably include aromatic, aliphatic or alicyclic polycarbodiimide compounds prepared by various processes. Among them, aliphatic or alicyclic polycarbodiimide compounds are preferred in terms of melt kneadability during extrusion or the like, and alicyclic polycarbodiimide compounds are more preferably used.

These carbodiimide compounds can be prepared by decarboxylative condensation of organic polyisocyanates. For example, they can be synthesized by decarboxylative condensation of various organic polyisocyanates at a temperature of about 70° C. or more in an inert solvent or without using a solvent in the presence of a carbodiimidation catalyst. The isocyanate content is preferably 0.1 to 5%, more preferably 1 to 3%. The content in the above ranges tends to facilitate the reaction with the polyamide resin and to improve hydrolysis resistance.

Organic polyisocyanates that can be used as starting materials for synthesizing the carbodiimide compounds include, for example, various organic diisocyanates such as aromatic diisocyanates, aliphatic diisocyanates and alicyclic diisocyanates and mixtures thereof.

Examples of organic diisocyanates specifically include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4-diisocyanate, methylcyclohexane diisocyanate, tetramethylxylylene diisocyanate, 2,6-diisopropylphenyl isocyanate, 1,3,5-triisopropylbenzene-2,4-diisocyanate, methylenebis (4,1-cyclohexylene) diisocyanate and the like, and two or more of them can be used in combination. Among them, dicyclohexylmethane-4,4-diisocyanate and methylenebis(4,1-cyclohexylene)diisocyanate are preferred.

To cap the ends of the carbodiimide compounds to control their degree of polymerization, terminal blocking agents such as monoisocyanates are also preferably used. Monoisocyanates include, for example, phenyl isocyanate, tolyl isocyanate, dimethylphenyl isocyanate, cyclohexyl isocyanate, butyl isocyanate, naphthyl isocyanate and the like, and two or more of them can be used in combination.

The terminal blocking agents are not limited to the monoisocyanates mentioned above, but may be any active hydrogen compounds capable of reacting with isocyanates. Examples of such active hydrogen compounds may include aliphatic, aromatic or alicyclic compounds having an —OH group such as methanol, ethanol, phenol, cyclohexanol, N-methylethanolamine, polyethylene glycol monomethyl ether and polypropylene glycol monomethyl ether; secondary amines such as diethylamine and dicyclohexylamine; primary amines such as butylamine and cyclohexylamine; carboxylic acids such as succinic acid, benzoic acid and cyclohexanecarboxylic acid; thiols such as ethyl mercaptan, allyl mercaptan and thiophenol; compounds having an epoxy group and the like, and two or more of them can be used in combination.

Carbodiimidation catalysts that can be used include, for example, phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and 3-phospholene isomers thereof; metal catalysts such as tetrabutyl titanate and the like, among which 3-methyl-1-phenyl-2-phospholene-1-oxide is preferred because of reactivity. Two or more of the carbodiimidation catalysts may be used in combination.

The content of the carbodiimide compounds is preferably 0.1 to 2 parts by mass, more preferably 0.1 to 1.5 parts by mass, even more preferably 0.2 to 1.5 parts by mass, especially preferably 0.3 to 1.5 parts by mass per 100 parts by mass of the polyamide resin (C). If it is less than 0.1 part by mass, the hydrolysis resistance of the resin is insufficient so that uneven delivery is more likely to occur during melt kneading such as extrusion, leading to insufficient melt kneading. If it exceeds 2 parts by mass, however, the viscosity of the resin during melt kneading significantly increases, which may impair melt kneadability and productivity.

EXAMPLES

The following examples and comparative examples further illustrate the present invention, but the present invention should not be construed as being limited to these examples.

[Polyamide Resins (C)]

The polyamide resins (P-1) to (PA-4) prepared in the following preparation examples 1 to 4 and MX-Nylon (brand name available from Mitsubishi Gas Chemical Company, Inc.) described later were used as polyamide resins (C).

Preparation Example 1

A reaction vessel equipped with a stirrer, a partial condenser, a total condenser, a thermometer, a dropping funnel and a nitrogen inlet as well as a strand die was charged with precisely weighed 12,135 g (60 mol) of sebacic acid, 3.105 g of sodium hypophosphite monohydrate (NaH$_2$PO$_2$.H$_2$O) (50 ppm expressed as the phosphorus atom concentration in the polyamide resin) and 1.61 g of sodium acetate, and thoroughly purged with nitrogen and then heated to 170° C. while stirring the inside of the system under a small amount of a nitrogen gas stream.

To this was added dropwise 8,172 g (60 mol) of m-xylylenediamine with stirring and the inside of the system was continuously heated while the condensed water generated was removed outside the system. After completion of the dropwise addition of m-xylylenediamine, melt polymerization reaction was continued for 40 minutes at an internal temperature of 260° C.

Then, the inside of the system was pressurized with nitrogen, and the resulting polymer was collected from the strand die and pelletized to give about 24 kg of polyamide PA-1. PA-1 had a melting point of 191° C.; a glass transition point of 60.0° C.; a number average molecular weight of 15,221; a relative viscosity of 2.27; a terminal amino group concentration of 55.6 μeq/g; and a terminal carboxyl group concentration of 75.8 μeq/g.

Preparation Example 2

A reaction vessel equipped with a stirrer, a partial condenser, a total condenser, a thermometer, a dropping funnel and a nitrogen inlet as well as a strand die was charged with precisely weighed 12,135 g (60 mol) of sebacic acid, 3.105 g of sodium hypophosphite monohydrate (NaH$_2$PO$_2$.H$_2$O) (50 ppm expressed as the phosphorus atom concentration in the polyamide resin) and 1.61 g of sodium acetate, and thoroughly purged with nitrogen and then heated to 170° C. while stirring the inside of the system under a small amount of a nitrogen gas stream.

To this was added dropwise 8,172 g (60 mol) of a 7:3 diamine mixture of m-xylylenediamine and p-xylylenediamine with stirring and the inside of the system was continuously heated while the condensed water generated was removed outside the system. After completion of the dropwise addition of the diamine mixture, melt polymerization reaction was continued for 40 minutes at an internal temperature of 260° C.

Then, the inside of the system was pressurized with nitrogen, and the resulting polymer was collected from the strand die and pelletized to give about 24 kg of polyamide PA-2. PA-2 had a melting point of 214° C.; a glass transition point of 64.4° C.; a number average molecular weight of 20,000; a relative viscosity of 2.45; a terminal amino group concentration of 15.0 μeq/g; and a terminal carboxyl group concentration of 85.0 μeq/g.

Preparation Example 3

A reaction vessel having an internal volume of 50 liters equipped with a stirrer, a partial condenser, a total condenser, a thermometer, a dropping device and a nitrogen inlet as well as a strand die was charged with precisely weighed 8,950 g (44 mol) of sebacic acid, 12.54 g (0.074 mol) of calcium hypophosphite, and 6.45 g (0.079 mol) of sodium acetate. The inside of the reaction vessel was thoroughly purged with nitrogen and then pressurized with nitrogen to 0.3 MPa and heated to 160° C. with stirring to homogeneously melt sebacic acid. Then, 6,026 g (44 mol) of p-xylylenediamine was added dropwise with stirring over 170 min. During then, the internal temperature was continuously raised to 281° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of p-xylylenediamine, the pressure was lowered at a rate of 0.4 MPa/hr to atmospheric pressure over 60 min. During then, the internal temperature rose to 299° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the resulting polymer was collected from the strand die and pelletized to give about 13 kg of polyamide PA-3.

PA-3 had a melting point of 281° C.; a glass transition point of 75.0° C.; a number average molecular weight of 14,493; a relative viscosity of 2.19; a terminal amino group concentration of 55.3 μeq/g; and a terminal carboxyl group concentration of 82.7 μeq/g.

Preparation Example 4

In a reaction vessel, a dicarboxylic acid mixture of adipic acid and isophthalic acid (available from A.G. International Chemical Co.) in a molar ratio of 9:1 was melted by heating in a nitrogen atmosphere, and then the temperature was raised while m-xylylenediamine was gradually added dropwise in a molar ratio of 1:1 between the diamine and the dicarboxylic acids while stirring the contents. After completion of the dropwise addition, the reaction was continued with stirring until a predetermined viscosity was reached, and then the contents were collected in the form of strands and pelletized in a pelletizer. The resulting pellets were placed in a tumbler and polymerized in the solid phase under reduced pressure to give polyamide PA-4 having a controlled molecular weight.

PA-4 had a melting point of 226° C.; a glass transition point of 94° C.; a number average molecular weight of 47,619; a relative viscosity of 3.5; a terminal amino group concentration of 12 μeq/g; and a terminal carboxyl group concentration of 30 μeq/g.

The melting point, glass transition point, relative viscosity, terminal amino group concentration, terminal carboxyl group concentration and number average molecular weight of each of polyamides PA-1 to PA-4 and MX Nylon described later were determined by the methods below.

(Melting Point and Glass Transition Point)

The melting point and glass transition point were determined by differential scanning calorimetry (DSC) using DSC-60 available from SHIMADZU CORPORATION as follows: a polyamide resin sample of about 5 mg was melted by heating from 30° C. to a temperature equal to or higher than an expected melting point at a rate of 10° C./min in a nitrogen atmosphere, then rapidly cooled, and then heated at a rate of 10° C./min to a temperature equal to or higher than the melting point.

(Relative Viscosity)

It was determined under conditions of a concentration of 1 g/100 ml in 96% sulfuric acid at a temperature of 25° C.

(Terminal Amino Group Concentration ([NH$_2$]))

In 30 ml of a phenol/ethanol (4:1) mixed solution was dissolved precisely weighed 0.5 g of the polyamide resin with stirring at 20 to 30° C., and after the polyamide resin was completely dissolved, the solution was titrated with 0.01 N hydrochloric acid to determine the concentration.

(Terminal Carboxyl Group Concentration ([COOH]))

In 30 ml of benzyl alcohol was dissolved precisely weighed 0.1 g of the polyamide resin with stirring at 200° C. under a nitrogen gas stream for about 15 min, and after the polyamide resin was completely dissolved, the solution was cooled to 165° C. under a nitrogen gas stream, and 0.1 ml of a phenol red solution was added with stirring. The solution was held at 160 to 165° C. and titrated with a titration solution of 0.132 g of KOH in 200 ml of benzyl alcohol (0.01 mol/l expressed as KOH content) until the endpoint was reached at which the color of the solution changed from yellow to red completely, and the concentration was determined at that point.

(Number Average Molecular Weight)

It was calculated by the equation below from the terminal amino group concentration [$NH_2$] (µeq/g) and the terminal carboxyl group concentration [COOH] (µeq/g) of the polyamide resin determined by the neutralization titrations described above.

Number average molecular weight=2,000,000/
([COOH]+[$NH_2$]).

Example 1

Polyamide PA-1 obtained in the preparation example described above was fed to a single screw extruder having a cylinder diameter of 30 mm and equipped with a flat die (PTM-30 available from Research Laboratory of Plastics Technology Co.). The polyamide was melted and kneaded under conditions of a cylinder temperature of 220° C. and a screw rotating speed of 15 rpm and then forced through the flat die having a width of 25 cm (lip gap 0.5 mm) to form a film-like material, which was contacted with and taken up by a roll having a diameter of 20 cm (roll temperature 70° C.) at 1 cm from the exit of the flat die while it was pressurized by a stainless steel pressure roll having a relief texture on the surface at a roll temperature of 70° C. and a roll pressure of 0.4 MPa at 16 cm from the exit of the flat die to form textures on the surface of the film. Further, the film was passed between five rolls and wound up in a roll of 1500 m around a paper tube. The take-up speed was 10 m/min. The surface roughness (Ra) of the resulting film and the peak-to-peak distance between adjacent crests of the relief texture on the surface of the film are shown in Table 1.

Further, the resulting film was subjected to various evaluations as described below. The results are shown in Table 1.

The evaluation methods are as follows.

(Surface roughness (Ra) and peak-to-peak distance between crests of the film)

They were determined according to the methods described above.

(Film-Forming Productivity)

The productivity was evaluated as good (⊚) if the film of 1500 m was not broken during the step of winding up the film in a roll around a paper tube under the conditions described above. The evaluation was (o) if one breakage occurred, or (x) if three or more breakages occurred.

(Post-Processing Properties of the Film)

The resulting film roll of 1500 m was coated with an adhesive using a gravure roll containing 100 lines of cells per inch having a depth of 100 µm, then dried in a drying oven at 60° C. (near the inlet) to 90° C. (near the outlet) and then laminated with a straight chain polyethylene film having a thickness of 40 µm (T.U.X.MC-S available from Mitsui Chemicals Tohcello, Inc.) using nip rolls heated at 70° C. and taken up at a take-up speed of 100 m/min, and the resulting roll was aged at 40° C. for 4 days to prepare a laminate film.

The processability was evaluated as good (⊚) if the polyamide resin film was not broken during the step of processing a length of 1000 m. The evaluation was (o) if one breakage occurred, or (Δ) if two breakages occurred, or (x) if three or more breakages occurred.

Example 2

Polyamide PA-2 obtained in the preparation example described above was fed to a single screw extruder having a cylinder diameter of 30 mm and equipped with a flat die (PTM-30 available from Research Laboratory of Plastics Technology Co.). The polyamide was melted and kneaded under conditions of a cylinder temperature of 240° C. and a screw rotating speed of 15 rpm and then forced through the flat die having a width of 25 cm (lip gap 0.5 mm) to form a film-like material, which was contacted with and taken up by a roll having a diameter of 20 cm (roll temperature 70° C.) at 1 cm from the exit of the flat die while it was pressurized by a stainless steel pressure roll having a relief texture on the surface at a roll temperature of 70° C. and a roll pressure of 0.2 MPa at 16 cm from the exit of the flat die to form a texture on the surface of the film. Further, the film was passed between five rolls and wound up in a roll of 1500 m around a paper tube. The take-up speed was 10 m/min. The Ra of the resulting film and the peak-to-peak distance between adjacent crests of the relief texture on the surface of the film are shown in Table 1.

Further, the resulting film was subjected to various evaluations. The results are shown in Table 1.

Example 3

Polyamide PA-3 obtained in the preparation example described above was fed to a single screw extruder having a cylinder diameter of 30 mm and equipped with a flat die (PTM-30 available from Research Laboratory of Plastics Technology Co.). The polyamide was melted and kneaded under conditions of a cylinder temperature of 310° C. and a screw rotating speed of 20 rpm and then forced through the flat die having a width of 25 cm (lip gap 0.5 mm) to form a film-like material, which was contacted with and taken up by a roll having a diameter of 20 cm (roll temperature 85° C.) at 1 cm from the exit of the flat die while it was pressurized by a stainless steel pressure roll having a relief texture on the surface at a roll temperature of 85° C. and a roll pressure of 0.1 MPa at 16 cm from the exit of the flat die to form a texture on the surface of the film. Further, the film was passed between five rolls and wound up in a roll of 1500 in around a paper tube. The take-up speed was 10 m/min. The Ra of the resulting film and the peak-to-peak distance between adjacent crests of the relief texture on the surface of the film are shown in Table 1.

Further, the resulting film was subjected to various evaluations. The results are shown in Table 1.

Example 4

A product of m-xylylene adipamide available from Mitsubishi Gas Chemical Company, Inc. (brand name "MX-Nylon"; grade S6007; melting point 243° C.; glass transition point 85° C.; number average molecular weight 25,000; relative viscosity 2.65; terminal amino group concentration 60 µeq/g; terminal carboxyl group concentration 20 µeq/g)

was fed to a single screw extruder having a cylinder diameter of 30 mm and equipped with a flat die (PTM-30 available from Research Laboratory of Plastics Technology Co.). The polyamide was melted and kneaded under conditions of a cylinder temperature of 260° C. and a screw rotating speed of 30 rpm and then forced through the flat die having a width of 25 cm (lip gap 0.5 mm) to form a film-like material, which was contacted with and taken up by a roll having a diameter of 20 cm (roll temperature 90° C.) at 1 cm from the exit of the flat die while it was pressurized by a stainless steel pressure roll having a relief texture on the surface at a roll temperature of 90° C. and a roll pressure of 0.2 MPa at 16 cm from the exit of the flat die to form a texture on the surface of the film. Further, the film was passed between five rolls and wound up in a roll of 1500 m around a paper tube. The take-up speed was 10 m/min. The Ra of the resulting film and the peak-to-peak distance between adjacent crests of the relief texture on the surface of the film are shown in Table 1.

Further, the resulting film was subjected to various evaluations. The results are shown in Table 1.

Example 5

Polyamide PA-4 obtained in the preparation example described above was fed to a single screw extruder having a cylinder diameter of 30 mm and equipped with a flat die (PTM-30 available from Research Laboratory of Plastics Technology Co.). The polyamide was melted and kneaded under conditions of a cylinder temperature of 245° C. and a screw rotating speed of 15 rpm and then forced through the flat die having a width of 25 cm (lip gap 0.5 mm) to form a film-like material, which was contacted with and taken up by a roll having a diameter of 20 cm (roll temperature 95° C.) at 1 cm from the exit of the flat die while it was pressurized by a stainless steel pressure roll having a relief texture on the surface at a roll temperature of 95° C. and a roll pressure of 0.1 MPa at 16 cm from the exit of the flat die to form a texture on the surface of the film. Further, the film was passed between five rolls and wound up in a roll of 1500 m around a paper tube. The take-up speed was 13 m/min.

The Ra of the resulting film and the peak-to-peak distance between adjacent crests of the relief texture on the surface of the film are shown in Table 1.

Further, the resulting film was subjected to various evaluations. The results are shown in Table 1.

Example 6

The same procedure as described in Example 1 was conducted except that polyamide PA-1 combined with 0.3 parts by weight of a product available from Nisshinbo Chemical Inc. under the brand name "CARBODILITE LA-1" (an alicyclic polycarbodiimide compound) per 100 parts by weight of polyamide PA-1 was used instead of polyamide PA-1 alone.

The evaluation results are shown in Table 1.

Comparative Example 1

A film was formed in the same manner as in Example 4 except that a roll having no relief texture on the surface was used as a pressure roll. The evaluation of film-forming productivity was x because three or more breakages occurred in the film during the step of winding up the film in a roll around a paper tube. Further, wrinkles occurred in the film roll. The evaluation of post-processing properties of the film was not performed.

The results are shown in Table 1.

TABLE 1

| | | | Examples | | | | | | Comparative |
|---|---|---|---|---|---|---|---|---|---|
| | | | 1 | 2 | 3 | 4 | 5 | 6 | example 1 |
| Polyamide resins | | | PA-1 | PA-2 | PA-3 | MX-Nylon | PA-4 | PA-1 | MX-Nylon |
| Components mol % | m-xylylenediamine | | 100 | 70 | | 100 | 100 | 100 | 100 |
| | p-xylylenediamine | | | 30 | 100 | | | | |
| | Adipic acid | | | | | 100 | 90 | | 100 |
| | Sebacic acid | | 100 | 100 | 100 | | | 100 | |
| | Isophthalic acid | | | | | | 10 | | |
| Carbodiimide compound content (parts by weight per 100 parts by weight of the polyamide resin) | | | | | | | | 0.3 | |
| Roll temperature (° C.) | | | 70 | 70 | 85 | 90 | 95 | 70 | 90 |
| Film thickness (μm) | | | 20 | 25 | 30 | 40 | 15 | 18 | 25 |
| Texturing | | | Yes | Yes | Yes | Yes | Yes | Yes | No |
| Ra (μm) | | | 0.30 | 0.15 | 0.08 | 0.016 | 0.011 | 0.30 | 0.007 |
| Peak-to-peak distance between textures (μm) | | | 0.41 | 0.75 | 0.66 | 0.85 | 0.50 | 0.41 | — |
| Film-forming productivity | | | ⊚ | ⊚ | ⊚ | ○ | ○ | ⊚ | X |
| Post-processing properties of the film | | | ⊚ | ⊚ | ○ | ○ | Δ | ⊚ | — |

INDUSTRIAL APPLICABILITY

The films of the present invention readily provide windable thin single layer films of xylylenediamine-based polyamide resins that were previously difficult to achieve, thereby facilitating the films to be taken up in rolls during the production thereof and thus providing highly commercially valuable film rolls, and the films further have high processability during post-processing by preventing breakage so that they can be used in various laminates or can be laminated with carbon fibers or glass fibers or plant fibers or the like in multiple layers and hot-pressed and used as highly elastic molded materials, and therefore, they will find very wide industrial applicability.

The invention claimed is:

1. A polyamide resin film, comprising:
a polyamide resin which is a polycondensate of a diamine and a dicarboxylic acid,
wherein the diamine includes xylylenediamine such that 70 mol % or more of the diamine is the xylylenediamine, and the polyamide resin film consists of a single layer film having a thickness in a range of 10 to 50 μm and formed in a roll and has a textured surface such that a surface roughness is in a range of 0.01 to 1 μm and that a regular pattern is formed including adjacent crests having a peak-to-peak-distance of 0.1 to 1 μm.

2. The polyamide resin film according to claim 1, wherein the textured surface of the polyamide resin film is formed by texturing a surface of a film comprising the polyamide resin with a plurality of texturing rolls comprising a first roll and a second roll positioned opposite to the first roll, and the first roll is positioned such that the film contacts with the first roll after the film is extruded from an extrusion die.

3. The polyamide resin film according to claim 1, wherein the xylylenediamine is m-xylylenediamine, p-xylylenediamine or a mixture of m-xylylenediamine and p-xylylenediamine.

4. The polyamide resin film according to claim 1, wherein the dicarboxylic acid is a dicarboxylic acid comprising 50 mol % or more of a straight chain aliphatic α,ω-dicarboxylic acid having 4 to 20 carbon atoms.

5. The polyamide resin film according to claim 1, wherein the dicarboxylic acid is a dicarboxylic acid comprising 70 mol % or more of a straight chain aliphatic α,ω-dicarboxylic acid having 4 to 20 carbon atoms and 1 mol % or more and less than 30 mol % of isophthalic acid.

6. The polyamide resin film according to claim 1, wherein the dicarboxylic acid is adipic acid, sebacic acid or a combination thereof.

7. The polyamide resin film according to claim 1, wherein the polyamide resin is a poly(m-xylylene sebacamide) resin, a poly(p-xylylene sebacamide) resin or a poly(m-xylylene/p-xylylene sebacamide) copolymer resin.

8. The polyamide resin film according to claim 1, further comprising 0.1 to 2 parts by mass of a carbodiimide compound per 100 parts by mass of the polyamide resin.

9. The polyamide resin film according to claim 1, wherein the polyamide resin film is an unoriented film.

10. A process for producing the polyamide resin film according to claim 1, comprising:
texturing a film comprising the polyamide resin with a plurality of texturing rolls comprising a first roll and a second roll positioned opposite to the first roll, wherein the film contacts with the first roll after the film is extruded from an extrusion die.

11. The process for producing the polyamide resin film according to claim 10, wherein each of the texturing rolls has a surface roughness in a range of 0.01 to 1 μm.

12. The process for producing the polyamide resin film according to claim 10, wherein each of the texturing rolls has a temperature T during the texturing which satisfies:

$Tg-10°\ C. \le T \le Tg+30°\ C.,$ where Tg is a glass transition temperature of the polyamide resin.

13. The process for producing the polyamide resin film according to claim 10, wherein the extrusion die has a distance to the texturing rolls of 0.1 to 300 cm.

14. The polyamide resin film according to claim 1, wherein the polyamide resin film is the single layer film having the thickness in a range of 10 to 40 μm.

15. The polyamide resin film according to claim 1, wherein the xylylenediamine is a mixture consisting of 60 to 100 mol % of m-xylylenediamine and 0 to 40 mol % of p-xylylenediamine, and the dicarboxylic acid includes sebacic acid such that 70 mol % or more of the dicarboxylic acid is the sebacic acid.

16. The polyamide resin film according to claim 1, wherein the polyamide resin film has the surface roughness in a range of 0.1 to 0.5 μm.

17. The polyamide resin film according to claim 1, wherein the xylylenediamine is a mixture consisting of 60 to 100 mol % of m-xylylenediamine and 0 to 40 mol % of p-xylylenediamine, the dicarboxylic acid includes sebacic acid such that 70 mol % or more of the dicarboxylic acid is the sebacic acid, and the polyamide resin film has the surface roughness in a range of 0.1 to 0.5 μm.

18. The polyamide resin film according to claim 15, wherein the polyamide resin film is the single layer film having the thickness in a range of 10 to 40 μm.

19. The polyamide resin film according to claim 16, wherein the polyamide resin film is the single layer film having the thickness in a range of 10 to 40 μm.

20. The polyamide resin film according to claim 17, wherein the polyamide resin film is the single layer film having the thickness in a range of 10 to 40 μm.

* * * * *